United States Patent
Eickelman et al.

(10) Patent No.: US 10,234,598 B2
(45) Date of Patent: *Mar. 19, 2019

(54) AGGREGATION AND ANALYTICS FOR APPLICATION-SPECIFIC OPTIMIZATION BASED ON MULTIPLE DATA SOURCES

(71) Applicant: International Business Machines Corporation, Armonk, NY (US)

(72) Inventors: Hans-Jurgen Eickelman, Nieder-Hilbersheim (DE); Ying Liu, Austin, TX (US); Thomas H. Osiecki, Austin, TX (US); Lucas Correia Villa Real, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/801,922

(22) Filed: Nov. 2, 2017

(65) Prior Publication Data
US 2018/0059286 A1    Mar. 1, 2018

Related U.S. Application Data

(63) Continuation of application No. 14/512,415, filed on Oct. 11, 2014, now Pat. No. 9,945,981, and a
(Continued)

(51) Int. Cl.
| | |
|---|---|
| *G06F 17/30* | (2006.01) |
| *G06F 7/00* | (2006.01) |
| *G01W 1/14* | (2006.01) |
| *G06G 7/50* | (2006.01) |

(52) U.S. Cl.
CPC ......... *G01W 1/14* (2013.01); *G06F 17/30412* (2013.01); *G06F 17/30554* (2013.01);
(Continued)

(58) Field of Classification Search
CPC ......... G06F 17/30412; G06F 17/30563; G06F 17/30554; Y02A 10/46; G01W 1/14; G06G 7/50
(Continued)

(56) References Cited

U.S. PATENT DOCUMENTS

| | | | |
|---|---|---|---|
| 7,860,344 B1 * | 12/2010 | Fitzpatrick | G06K 9/3241 |
| | | | 345/419 |
| 9,083,610 B2 * | 7/2015 | Griff | H04L 41/12 |

(Continued)

FOREIGN PATENT DOCUMENTS

WO    2007130865 A2    11/2007

OTHER PUBLICATIONS

Villa Real, Lucas C., et al., "A Novel Noise Removal Algorithm for Vertical Artifacts in Digital Elevation Models", 34th Asian Conference on Remote Sensing (ACRS), Proceedings of ACRS 2013, Bali. Oct. 20-24, 2013. 7 pages.

(Continued)

*Primary Examiner* — Kuen S Lu
(74) *Attorney, Agent, or Firm* — Marcia L. Doubet

(57) ABSTRACT

Aggregating and transforming data, and performing analytics thereupon, for application-specific optimization based on multiple data sources. The data is preferably ingressed automatically, and may originate from various public and/or private data sources. Data transformation preferably aligns the data aggregated from the various sources, to thereby allow meaningful referencing. Complex and non-aligned data can therefore be consolidated, such that it is readily digestible by simulation (or other) software. In an embodiment, risk of flooding for a supply chain is computed from the aggregated and transformed data, using data analytics based on physical computation for flood risk assessment, allowing the supply chain to be optimized with regard to threat of flooding and/or actual flooding. In another embodi-
(Continued)

ment, risk of wild fire may be assessed. Other types of risk may also be assessed.

16 Claims, 10 Drawing Sheets

Related U.S. Application Data continuation of application No. 14/485,669, filed on Sep. 13, 2014, now Pat. No. 9,952,353.

(52) U.S. Cl.
CPC ......... *G06F 17/30563* (2013.01); *G06G 7/50* (2013.01); *Y02A 10/46* (2018.01)

(58) Field of Classification Search
USPC ...................................................... 707/602
See application file for complete search history.

(56) References Cited

U.S. PATENT DOCUMENTS

| | | | |
|---|---|---|---|
| 2007/0112936 A1* | 5/2007 | Harrison | G06Q 30/02 709/217 |
| 2009/0222482 A1* | 9/2009 | Klassen | G06F 17/30241 |
| 2010/0106337 A1* | 4/2010 | Sacks | A01G 25/16 700/284 |
| 2011/0295575 A1* | 12/2011 | Levine | G06Q 30/02 703/2 |
| 2013/0046570 A1 | 2/2013 | Miller et al. | |
| 2013/0110399 A1 | 5/2013 | Moss et al. | |
| 2013/0116920 A1 | 5/2013 | Cavalcante et al. | |
| 2013/0132045 A1 | 5/2013 | Mello et al. | |
| 2013/0338920 A1 | 12/2013 | Pasken et al. | |
| 2014/0122250 A1* | 5/2014 | Ransom | G06Q 30/02 705/14.67 |
| 2014/0132409 A1* | 5/2014 | Billman | G08B 19/00 340/539.1 |
| 2014/0278708 A1* | 9/2014 | Byk | G06Q 10/06315 705/7.25 |
| 2014/0288995 A1* | 9/2014 | Huff | G06Q 10/0635 705/7.28 |

OTHER PUBLICATIONS

List of IBM Patents or Patent Applications Treated as Related. Nov. 2, 2017. 2 pages.

* cited by examiner

AGGREGATION AND ANALYTICS FOR APPLICATION-SPECIFIC OPTIMIZATION BASED ON MULTIPLE DATA SOURCES

BACKGROUND OF THE INVENTION

The present invention relates to aggregating data, and performing analytics thereupon, for application-specific optimization based on multiple data sources. In an embodiment, risk of flooding for a supply chain is computed thereupon.

As will be readily understood, professionals who are working in the field of risk analysis today are faced with a deluge of data. A problem is then how to derive useful information from these torrents of data, and to make use of the derived information for a particular application. When working in natural disaster forecasting or prediction and related endeavors (referred to hereinafter as "natural disaster management", for ease of reference), it is critical to obtain a best possible result from the information.

BRIEF SUMMARY OF THE INVENTION

The present invention is directed to aggregation and analytics for application-specific optimization based on multiple data sources. In one embodiment, this comprises: determining a location of interest; determining a plurality of data sources that describe a physical environment of the location; automatically ingressing, from selected ones of the plurality of sources, the data that describes the physical environment; transforming the ingressed data into data maps that are aligned to one another to allow referencing therebetween; evaluating risk of natural disaster pertaining to the location by using the aligned data maps as input to an evaluator selected from the group consisting of a simulation model and an analytic process; and responsive to determining that the risk of natural disaster pertaining to the location exceeds a predetermined threshold, determining an alternative to the location to thereby avoid using, at least temporarily, the location of interest, the alternative location being determined, by the evaluator, to have a risk of natural disaster that does not exceed the predetermined threshold. In addition of instead of using simulation model(s) and/or analytic process(es), the data maps may be provided for other purpose(s), such as review by an end user. In one embodiment, the location pertains to a supply chain and the evaluating risk evaluates a risk of flooding for the location. In one embodiment, the evaluating risk evaluates a risk of wild fire for the location.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

DETAILED DESCRIPTION OF THE INVENTION

Embodiments of the present invention are directed toward aggregating and transforming data, and performing analytics thereupon, for application-specific optimization based on multiple data sources. The data is preferably ingressed automatically, and may originate from various public and/or private data sources and/or market exchange(s). Data transformation preferably aligns the data aggregated from the various sources, to thereby allow meaningful referencing. Complex and non-aligned data can therefore be consolidated, such that it is readily digestible by simulation (or other) software. In an embodiment, risk of flooding for a supply chain is computed from the aggregated and transformed data, using data analytics based on physical computation for flood risk assessment, allowing the supply chain to be optimized with regard to threat of flooding and/or actual flooding. Note, however, that the flood risk assessment embodiment is described herein by way of illustration and not of limitation, and an embodiment of the present invention may be used with risk analytics extendable to other problems which can be solved with geo-specific data sets.

As noted earlier, professionals who are working in natural disaster forecasting or prediction need to obtain a best possible result from gathering and analyzing torrents of data. Some data sources may be public domain, while other data may come from private or proprietary sources. Available data sources may be very diverse, and with that diversity, a number of issues may arise. It may happen that some data sources are too general to be useful, and the quality of data from some sources might not necessarily be suitable for a specific application. Some of the data sources may not contain directly relevant information for a specific application, although their data may be quite valuable in other application(s). New data sources may be added over time, and may provide valuable data that should be considered. Cost of data may also be an issue. High-quality and relevant data might be available from private sources, for example, but at a high cost. A decision may need to be made regarding a trade-off between quality and cost for a particular application.

It is also noted that relevant information for a particular application may be scattered among multiple sources, and these sources may use differing data formats. Geographical data that varies in resolution and other parameters may be obtained, for example, where useful analytics cannot be performed until the resolution (and other) differences are resolved.

An embodiment of the present invention is directed to addressing the above-discussed issues and more, as will be described herein.

Figure 1:
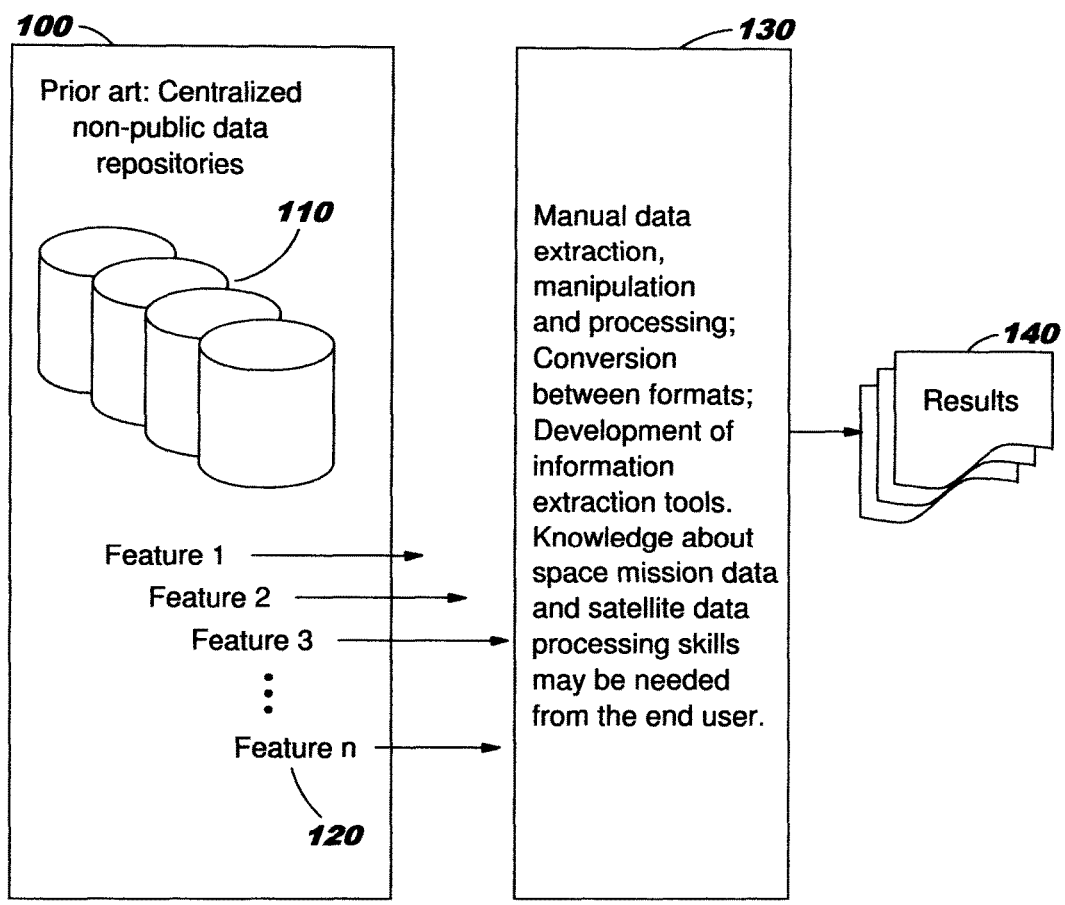
FIG. 1 illustrates a prior art approach to natural disaster management.

By way of background, a prior art approach to natural disaster management is illustrated in FIG. 1. As shown therein, an input process 100 may obtain data from a number of centralized data repositories 110, where these repositories 110 may be private data sources. The various repositories may each provide one or more features 120, and a number of processing steps 130 may be performed on the data thus obtained to yield results 140. As shown by way of example at 130, these processing steps may include manual data extraction, manipulating, and processing; conversion between different data formats; and development of information extraction tools. These prior art techniques suffer from a number of disadvantages, however, some of which have been noted above. A heavy burden may also be placed on the end user when using these known techniques. In an environment where portions of the data are obtained from one or more satellites or from a government agency working with space missions, for example, it may be necessary for the end user to have knowledge about space mission data and/or skills for processing satellite data.

Figure 2:
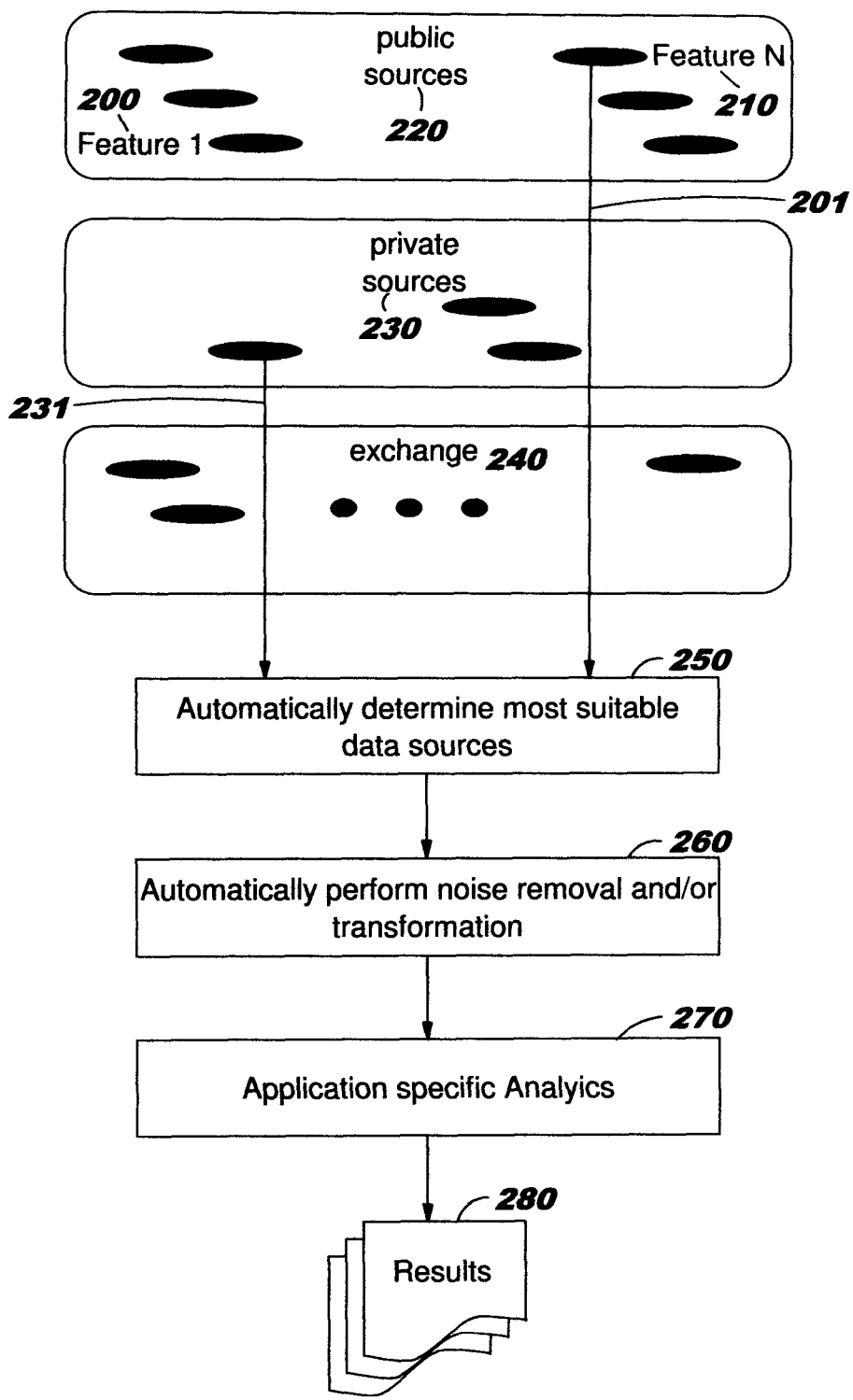
FIG. 2 illustrates a high-level view of aggregating relevant data from multiple data sources, and performing analytics on the data, according to an embodiment of the present invention.

FIG. 2 illustrates, at a high level, the approach of embodiments of the present invention for aggregating relevant data from multiple data sources, and performing analytics on the data. The data is preferably ingressed automatically and aggregated, and may originate from public sources 220, private sources 230, and/or various market exchanges 240 (i.e., sources which sell data to customers). The data from each source may include various features, shown generally in FIG. 2 as features 1 through N (see reference numbers 200, 210). For a particular application, some of these features may be useful, while other features are not, as shown by arrow 221 for feature 200 and lack of a corresponding arrow for feature 210. The features that are not deemed useful in a particular application, however, may be useful in other applications. Accordingly, an embodiment of the present invention automatically determines the most suitable data sources for the particular application, as shown by arrows 221, 231, 241 connecting to Block 250. The selection of data sources to be included for the particular application may be based on criterion that includes, by way of example, data availability, data quality, and/or a trade-off between data quality and cost. (See also the discussion of selecting data sources in Blocks 600-615 of FIG. 6, below.)

Block 260 notes that the data which has been aggregated according to Block 250 may then undergo automatic noise removal and/or transformation (and the order thereof may be application-dependent). An example of noise removal is to programmatically remove clouds, snow, atmospheric particles, and so forth from data that provides images of Earth. One or more transformations may be performed. (See also the discussion of transformations with reference to 630-665 of FIG. 6, below.) As an example of transforming the data, it may be necessary to align data from multiple data sources in preparation for further analytics. Geographical data, for example, may be of varying resolution among data sources, and it may be necessary to programmatically manipulate such data into a common resolution. The geographical data might be expressed using different coordinate systems, as another example, in which case it may be necessary to programmatically convert such data into a common coordinate system. Data obtained from satellites, for example, might be specified with reference to different elevations and/or orientations, and the programmatic manipulation in this case serves to align the coordinates for efficient comparison and other analytics. Example transformations include automatic raster georeferencing, scaling, rotation, and cropping.

Various simulations and/or data analytics may be performed, depending on the application, as shown at Block 270, in order to derive useful information for application-specific optimization. Physics-based analytics may be performed, for example, such as using physics-based water transport models with high-performance computing systems to predict the flow of water under various circumstances. Knowledge-based analytics solutions, and/or analytics based on empirical rules, may be used in addition or instead. The feature extraction and abstraction performed at Block 270 to derive useful results 280 may be computationally intensive in many cases. (See also the discussion of simulations 670 and analytics 675 of FIG. 6, below.) Results 280 may comprise, by way of example, a map of a geographic region that has been annotated to reflect portions of that geographic region which are predicted to be susceptible to flooding under supplied parameters. Results 280 may be provided to a disaster management agency, as one example, to assist them in preparing for a predicted weather (or other) event. As another example, it may be desirable to perform a tuning process for the overall system, whereby an iteration is performed to generate results 280, and these generated results are then compared to actual results to gain a sense of confidence in the predictions of the system for future use. Note also that results 280 may be of use to an end user as a form of intermediate data, prior to (or without) processing by a simulation model or analytics, and thus reference herein to use of simulation models and analytics is by way of illustration and not of limitation.

Figure 3:
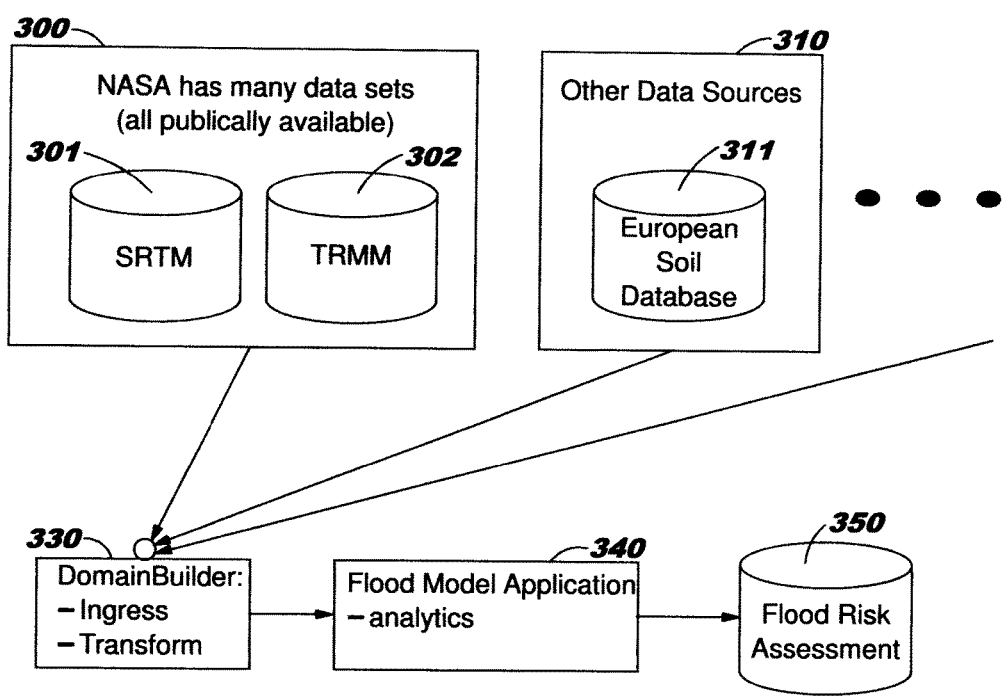
FIG. 3 illustrates use of an embodiment of the present invention in an application for flood risk assessment for supply chain optimization.

FIG. 3 illustrates use of an embodiment of the present invention in an application for flood risk assessment for supply chain optimization. As noted therein at 300, the National Aeronautics and Space Administration ("NASA") has a number of publicly-available data sets. These include digital elevation models from the Shuttle Radar Topography Mission ("SRTM") 301 and global precipitation models from the Tropical Rainfall Measuring Mission ("TRMM") 302. Other types of data may be obtained from other data sources 310, such as soil data maps provided in the European Soil Database 311 by the European Soil Data Center.

An embodiment of the present invention aggregates these data sources upon ingress to a component referred to herein as Domain Builder 330, and performs transformations upon the data. Preferably, the data ingress occurs automatically, which allows (for example) large collections of data to be gathered over a period of time in a non-interactive download; parallel download may also be used as needed. Session cookies may be used to allow coordinated download of voluminous data, as needed. In the example of flood risk assessment, it is noted that data from the above-discussed SRTM data source 301 is organized as a collection of tiles, where each tile covers one degree of longitude and one degree of latitude. The resolution of these tiles varies, depending on the portion of Earth to which they correspond.

Data for the United States, for example, is generally three times the resolution of data for other parts of the world, with a corresponding difference in the number of cells in each of the tiles. A number of different instruments were on board during the gathering of TRMM data 302, and measured data for rainfall, clouds, lightning, and so forth. The European Soil Database 311 provides various types of soil information, and is organized as a collection of grid files with cell sizes of 10 square kilometers and static soil maps in other data formats. Thus, the Domain Builder 330 of the present invention performs transformations to align data aggregated from these various data sources, in view of possibly-differing data types, for input to a Flood Model application 340.

Flood Model application 340 will perform various analytics, analyzing the transformed data in view of a supply chain scenario (in this example) to produce a flood risk assessment 350. For example, if the supply chain produces and distributes widgets, various raw materials may be sent from multiple suppliers to a manufacturing plant as part of this process, and output of the manufacturing plant may then be sent to multiple distribution centers. An embodiment of the present invention may predict that severe flooding is likely to occur near one of the supplier locations, which may impede delivery of that supplier's portion of the raw materials to the manufacturing plant. An embodiment may further conclude that an alternate delivery path is available from that supplier, where this alternate delivery path will suffer less (or no) flooding, and risk assessment 350 may thus indicate that this alternate delivery path should be used. In addition or instead, an embodiment may determine that flooding is occurring upstream from one of the distribution centers, making this distribution center unreachable from the manufacturing plant for a particular predicted period of time. Risk assessment 350 may therefore indicate that the output of the manufacturing plant which would normally be sent to the unreachable distribution center should be sent to one or more of the other distribution centers for the period of time, and that normal operations can resume after that period of time has elapsed. As can be seen by this example, an embodiment of the present invention is not limited to predicting risk for a particular location, and instead allows predicting risk for one or more downstream locations as well (and accordingly, discussions herein which refer to "location of interest" should be construed to include the downstream locations as well).

Figure 4:
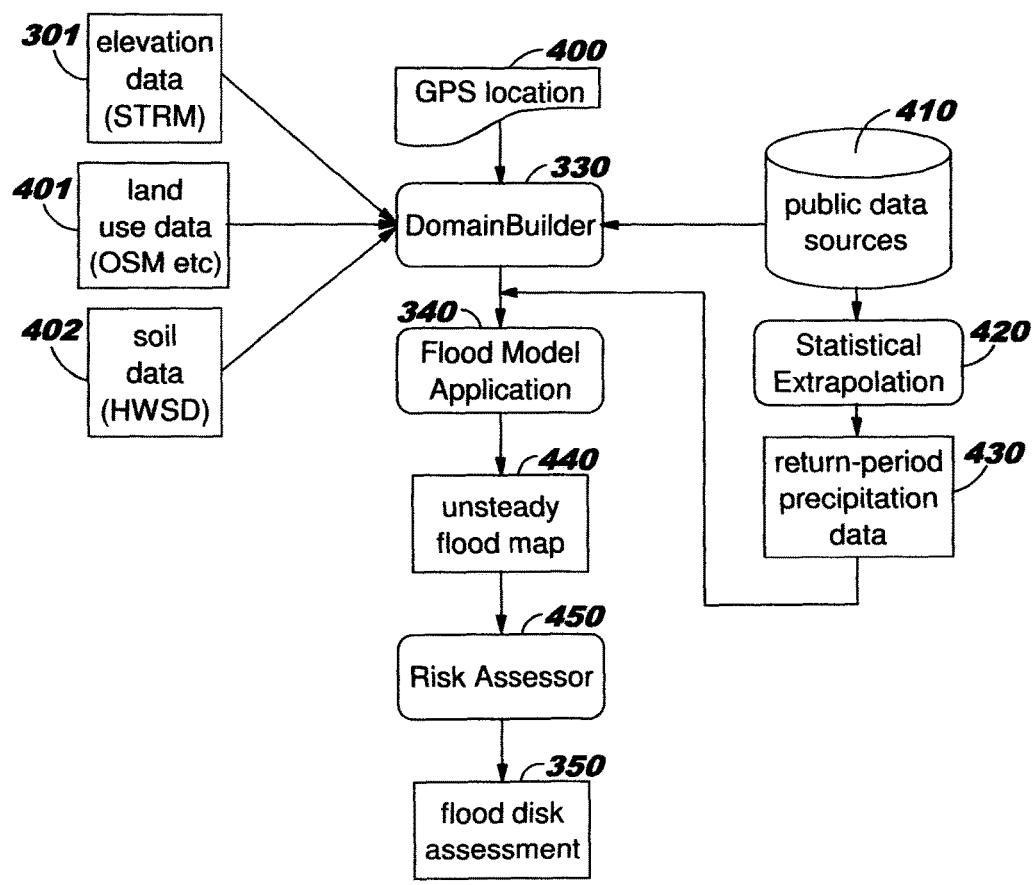
FIG. 4 illustrates an overall flow of the flood risk assessment scenario.

FIG. 4 illustrates an overall flow of the flood risk assessment scenario. A location of interest for the flood risk is provided at 400, and may comprise latitude and longitude coordinates, shown in FIG. 4 as a Global Positioning Satellite ("GPS") location. Domain Builder 330 aggregates input data from public data sources 410, as well as elevation data 301 (which is shown as the SRTM data), land use data 402, and soil data 403. In this example, the land use data 401 may come from OpenStreetMap ("OSM"), the Natural Earth Dataset, or another source, and the soil data 402 may come from the Harmonized World Soil Database ("HWSD"), the above-noted European Soil Database 311, or another source. In general, the various data sources typically provide their data organized as cells that pertain to a particular grid of a geographic region, and the Domain Builder 330 aggregates and transforms the data of various types, from various sources, as needed to obtain knowledge about the location of interest 400.

Figure 5:
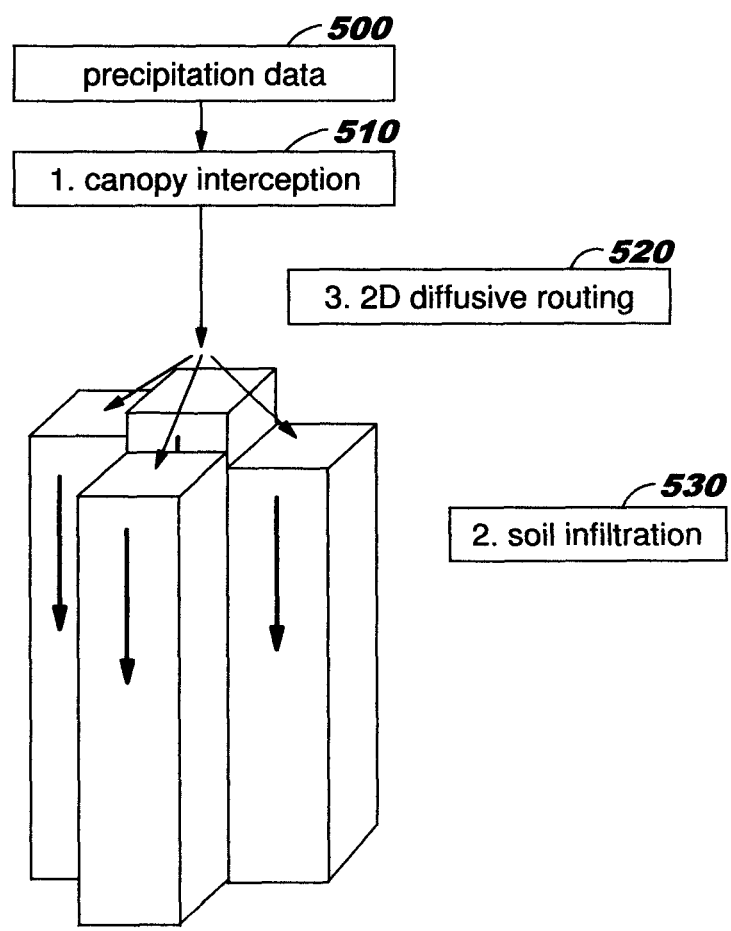
FIG. 5 depicts one approach which may be implemented for the statistical extrapolation process shown therein.

FIG. 4 further illustrates a Statistical Extrapolation component 420, which may use data from public data sources 410 to generate return-period precipitation data 430. As is known, a return period for rainfall is an estimate of how often a rainfall event with certain parameters will occur at a particular geographic location. Various techniques for generating return-period precipitation estimates are known in the art (details of which are not deemed necessary to an understanding of the present invention). This rainfall estimate—or more generally, precipitation estimate—is provided to the Flood Model application 340 in addition to the data as aggregated and transformed from the Domain Builder 330. FIG. 5 depicts one approach which may be implemented by Flood Model application 340 for Statistical Extrapolation component 420, as will now be described.

Flood Model application 340 receives precipitation data 500 (as well as other relevant data) from the Domain Builder 340, and may perform one or more analytics on the data to simulate water movements at the location of interest 400. As will be understood by those of skill in the relevant art, this analysis may involve a very large physical area, which may be represented in the simulation by millions of unknowns. As a first analytic (by way of example), the Flood Model application 340 may perform a canopy interception analysis 510. The canopy interception analysis is preferably directed toward determining the impact of the physical canopy at the location of interest on the amount of rainfall that reaches the ground at that location. For example, in a heavily forested location, rainfall may be diverted by the tree canopy such that boundary areas which have a more open canopy will be more likely to experience flooding than the location underneath the trees. A soil infiltration analysis 530 may also be performed by the Flood Model application 340. The soil infiltration analysis is preferably directed toward determining how the water (that is, the water which is predicted to reach the ground) will enter the soil at the location of interest, in view of the ability of the particular soil at the location to absorb the predicted rainfall. The amount of water already present in the soil, for example, is important in determining the likelihood that additional rainfall will lead to flooding; the type of soil similarly affects the likelihood of flooding. The above-noted HWSD provides tables defining soil properties (including percent clay, percent sand, and percent silt) for different geographical locations, and an embodiment of the present invention leverages this information for analyzing soil infiltration of a given cell or cells. Various equations have been developed for calculating infiltration in view of such information, such as Horton's equation, the Green-Ampt equation, and so forth (details of which are known to those of skill in the relevant art, and which are not deemed necessary to an understanding of the present invention). The Flood Model application 340 may also perform a 2-dimensional ("2D") diffusive routing analysis 520. The 2D diffusive routing analysis 520 is directed toward determining how water will flow at the location of interest, in terms of mass and momentum, and in particular, to determine the run-off at the location. This analysis 520 is preferably flow-limiting to ensure stability. Various approaches to calculating diffusive routing may be used (details of which are known to those of skill in the relevant art, and which are not deemed necessary to an understanding of the present invention). It should be noted that the analytics of the Flood Model application 340 may be compute-intensive, and parallel computers may be leveraged to speed execution time.

Returning again to FIG. 4, an output of Flood Model application 340 may be an unsteady flood map 440, which represents flow where the water flow varies with time. (The concept of unsteady flow models is known to those of skill in the relevant art, along with advantages over steady flow models, and details thereof are not deemed necessary to an understanding of the present invention.) The unsteady flow map 440 is shown as input to a Risk Assessor component 450. This Risk Assessor component 450 generates the flood risk assessment 350.

The Risk Assessor component 450 preferably assesses risk by checking the simulated results with respect to predefined thresholds. In one embodiment, two different methods are involved. In a first of the two methods, only a threshold is used, along with two threshold values. If a lower of the threshold values is exceeded in the simulated results, the risk of flooding is raised from "low" to "medium", and if the higher of the threshold values is exceeded, the risk of flooding is raised from "medium" to "high". In a second of the two methods, a threshold and a time window are used. In this case, if the simulated results exceed a threshold and also remain above the threshold for a particular period of time, then the risk is raised. If the threshold is not exceeded for sufficient time, in this second method, then the risk is not raised.

Figure 6:
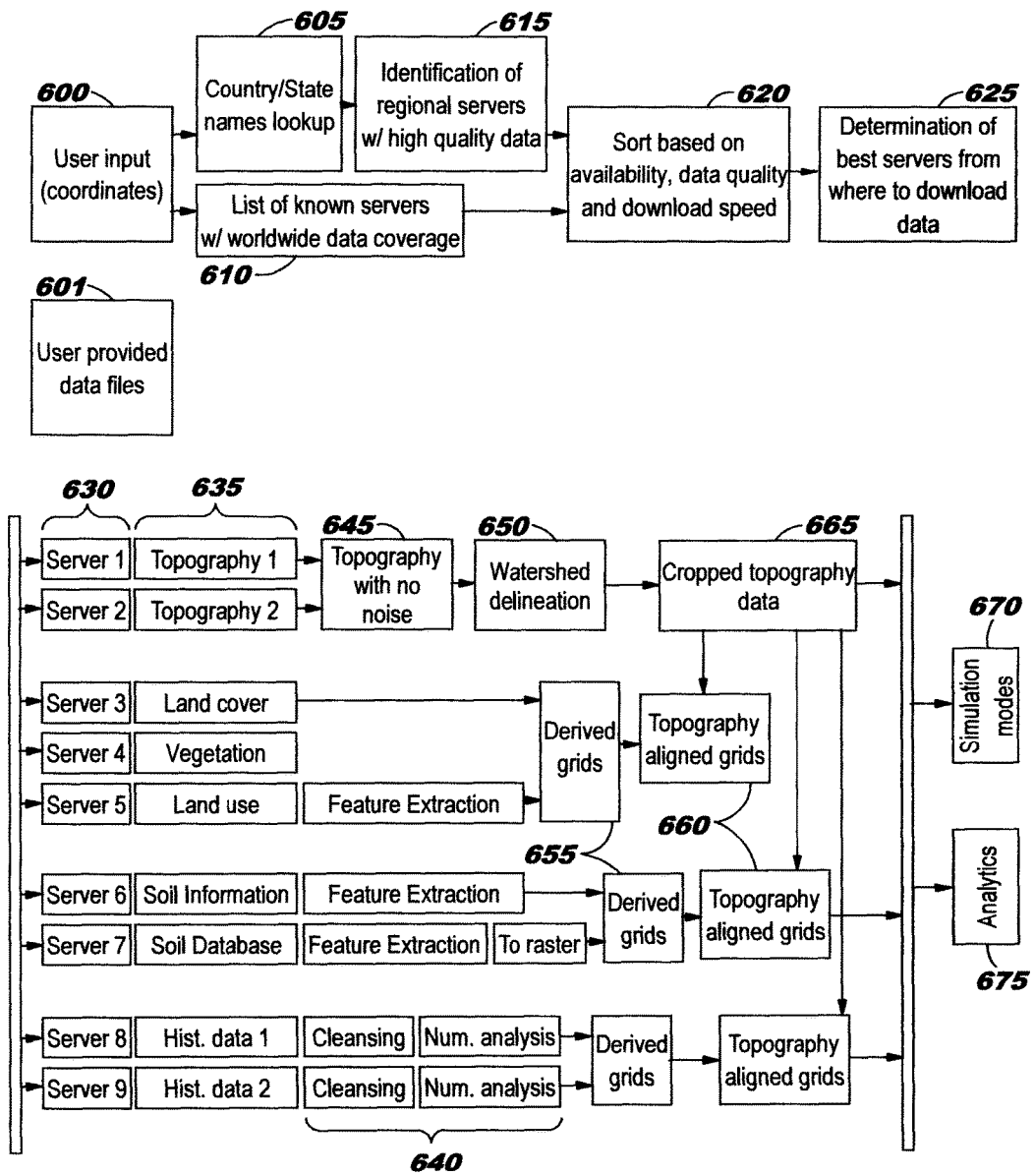
FIG. 6 provides a more detailed view of processing that may be used in a flood risk assessment flow.

FIG. 6 provides a more detailed view of processing that may be used in a flood risk assessment flow. User input identifying a location of interest is obtained at Block 600 (referred to herein in the singular, by way of illustration but not of limitation), and this preferably comprises obtaining coordinates as discussed above with reference to 400 of FIG. 4. Optionally, one or more user-provided data files may also be input to the process, as shown at Block 601. User-provided data files 601 may comprise data from private or government sources, for example, and may provide data with better spatial resolution, or more features, than those downloaded from public sources. The user-provided data files 601 may also be used to augment the spatial resolution of public data (in a similar manner to combining soil data from several different sources, for example, for better spatial resolution). It may be necessary to perform transformation(s) on the data files 601, such as updating the coordinate system and/or file format and mapping specific features from the maps in data files 601 to features available in public data. Mapping data structures may be used, for example, to convert features such as "apple tree" and "pine" in the user-provided data files 601 into a feature such as "tree" to align with usage in vegetation data from a public data source.

The coordinates or other location-identifying user input is used at Block 605 to determine where the location is, which may comprise using the coordinates to access a mapping which correlates the coordinates with identifying name information associated with the location of interest. The mapping may be stored (for example) as a table or other data structure (or a plurality thereof), in which one or more entries identify the country, state, and so forth for the location of interest. In another approach, reverse geo-coding may be used to translate from latitude/longitude values into country/state/city names (or other corresponding name information that is suitable for identifying the region). Some data sets that may be deemed useful in an embodiment of the present invention are limited to a particular geographic region, or provide differing types of data for different regions, as has been mentioned above (with reference, for example, to SRTM 301 and European Soil Database 311 of FIG. 3). Accordingly, the information obtained at Block 605 is preferably used to locate servers (or more generally, data sources) which provide high-quality data (or, at least the highest quality data available) for the geographical region identified by the processing of Block 605. Local government agencies may provide region-specific data, for example, which is often of high fidelity. In addition or instead, Block 610 accesses a data structure (or plurality thereof) identifying servers or data sources which provide data with worldwide coverage. Referring back to FIGS. 3 and 4, the processing of Blocks 610 and 615 may together comprise identifying the data sources 301, 302, 311, 401, and/or 402 of the example. The types of data may include elevation, canopy, soil type, vegetation, historical, and so forth. Notably, various parameters related to the data available from each of the data sources are preferably obtained by Blocks 610 and 615, such as the particular type of data available from each source, the data quality, the cost, and so forth (or alternatively, a location of one or more data structures where such parameters are defined).

Following operation of Blocks 610 and 615, the obtained information regarding data sources for the location is interest is sorted or otherwise organized at Block 620. It may happen, for example, that some data is available from multiple sources, where it is preferably to access a particular one of the sources due to quality, cost, access or download speed, and availability of information from that source. Higher priority is preferably given to the sources providing higher-quality data, although cost versus quality trade-offs of the type discussed earlier may also be used to prioritize some sources over others. Block 625 then determines, from the information prepared by Block 620, which are the best sources for downloading the relevant data for the location of interest.

Reference numbers 630-675 illustrate processing that may be performed by an embodiment of the flood risk assessment on the data obtained from the sources selected at Block 625. The selected sources are identified generally at 630, and in the depicted example, are denoted as "Server 1" through "Server 9". The type of data available from each of the selected sources is identified generally at 635. In the example, it can be seen that topography data is provided by Server 1 and Server 2, while land cover, vegetation, and land use data are provided by Servers 3-5, respectively; soil information and a soil database are provided by Servers 6-7, respectively; and historical data is provided by both Server 8 and Server 9. Server 1 might provide topography data from SRTM 301 or another satellite source, for example, while Server 2 might provide topography data gathered by airplanes and/or helicopters using light detection and ranging ("LiDAR") techniques to capture surface characteristics of Earth using light pulsing. Server 3 might provide land cover data describing grass, asphalt, bare ground, and so forth that has been observed by field inspection or by distance imaging, while Server 4 might provide a vegetation map developed by a national parks agency or smaller regional agency to describe what types of vegetation are present in particular locations, and Server 5 might provide a land use map developed by a regulatory agency or taxing body to indicate which portions of a region are agricultural and which are urban. Servers 6 and 7 might provide soil properties maps from the above-mentioned HWSD, for example. Server 8 might provide historical data pertaining to rainfall from a weather service agency, for example, while Server 9 provides historical data pertaining to flooding from a university.

Various types of transformations may be performed on the data from one or more of the data sources, as shown generally by reference number 640. As shown in the example of FIG. 6, certain features may be extracted from among the land use, soil information, and soil database data provided by Servers 5-7, and the data from the feature extraction for the soil database may be further transformed into a raster format. Feature extraction and format conversion is not limited, however, to the particular types of data for which these processes are shown in FIG. 6. As one example, feature extraction might be used with topology data to select out features such as valleys and rivers, for purposes of looking at where water will flow. Internal rules may be defined in order to specify what types of features to be extracted from which data sources and/or data set types. Rules may also be used to specify transformations involving format conversions. (In the case of the above-mentioned OSM data source, for example, the raw data is provided in markup language format, which will be converted by an embodiment of the present invention into a vector graphics format, which can then be converted to raster format.) For purposes of the flood risk assessment, the historical data of interest (provided by Servers 8 and 9) pertains to what has happened, in the past under particular circumstances, at the location of interest in terms of flooding. For example, if historical data for weather events spanning the previous 50 years is available for a particular geographic region, that data may be useful for predicting what types of weather will occur in that region in the future. The historical data from Server 8 and Server 9 may undergo a cleansing process. Cleansing of historical data is known in the art, and may comprise processing such as removing (or replacing) data records that are known or thought to be incorrect, incomplete, or corrupt and/or removing (or replacing) individual pixels in data cells if those pixels are deemed to be unusable for similar reasons. As one example of cleansing that is directed toward pixels, it may be desirable to programmatically mask out the ocean when analyzing data for a nearby geographic location. Various numerical analysis may then be performed on this cleansed historical data—for example, to identify trends or patterns from the historical data.

Referring back to the topography data from Server 1 and Server 2, a noise removal process may be performed to remove various noise artifacts therefrom, as shown at 645. Images obtained using satellites, for example, may include cloud formations and other artifacts which tend to obscure the underlying data of interest, which in turn tends to interfere with efficient operation of simulation models and other processes. Accordingly, a noise removal process may be used to identify and remove such noise artifacts from the topography data. (Techniques for noise removal—such as data smoothing functions—are known in the art, and a detailed description thereof is not deemed necessary to an understanding of the present invention.) A watershed delineation process is then preferably performed, using the resulting topographical data, to determine where the watersheds are on this topography—that is, near the location of interest—as noted at 650. This delineation process preferably comprises using a reference elevation data grid for the location of interest. A cropping process is then preferably performed, to thereby locate areas of the topography where the watersheds are important, as shown at 665. Preferably, only grid cells belonging to the located watersheds are kept, while other cells are removed (given that these cells do not directly contribute to precipitation run-off that can potentially reach the location of interest) when creating cropped topography data 665. In this manner, data to be subsequently provided as input to topography-aligned grids 660, simulation models 670, and/or analytics 675 (which are further discussed below) is more efficient because of its focus, which (in summary) represents a combination of calculated watersheds around the location of interest, using the reference elevation data grid, and the estimated amount of precipitation for a given period of time as extrapolated from past weather patterns.

Reference number 655 is associated with so-called "derived grids" in FIG. 6. As used herein, a derived grid is a grid created by combining two or more other grids. For example, if it is known that the land cover data from Server 3 provides a weak description for vegetation while Server 4 provides richer vegetation information, then all vegetation information cells from Server 3's data may be overwritten with information taken from the data of Server 4. And, if very up-to-date vegetation information is available from another data source—perhaps even for only a subset of the geographic region of interest—then this up-to-date vegetation information may be used to overwrite corresponding portions of the combined Server 3+Server 4 data. The derived grids 655 from Servers 3-5 may therefore give a better view of what the topography is at the location of interest, while the derived grids 655 from Servers 6-7 give a better view of the soil at the location of interest and derived grids from Servers 8-9 give a better view of what happens at the location of interest when it rains (for example). The land use maps provided by the above-mentioned OSM, for example, may use any of more than 100 map features (such as tagging locations in a map as "grassland", "paved surface", "street", or other features). Accordingly, an embodiment of the present invention preferably extracts relevant ones of these map features from the OSM data, and may convert the extracted data into representations applicable to the simulation or analytics method deployed. In one embodiment, the representations include canopy interception capabilities and flow resistance coefficients, commonly known as "Manning's N" (which describe the resistances of water channels, streams, flood plains, and so forth with numerical values). Land use data may be provided as shapefiles from some data sources (describing, for example, a road as a line shape; a lake as a polygon shape; and so forth), and a shapefile parser may be used to extract specific features of interest from such shape files. More generally, as has been discussed earlier, data obtained from different sources may not be of the same resolution, orientation, and so forth, and thus the Domain Builder 330 preferably uses parameters pertaining to each data source to determine what types of mapping functions are needed for data alignment and retrieval, and such mapping functions are preferably carried out for purposes of combining the various maps into a single dataset represented by each of the derived grids 655.

Reference number 660 is associated with so-called "topography-aligned grids" in FIG. 6. As used herein, topography-aligned grids are maps (e.g., soil and vegetation maps) which have been aligned to have the same number of pixels and to match the same geo-location as a reference topography (or elevation) map. Notably, these topographically-aligned grids 660 all contain information for the same physical area. The topography-aligned grids 660 are provided as input to one or more simulation models 670 and/or analytics 675 (where simulation models 670 and analytics 670 are referred to herein in the plural by way of illustration but not of limitation). A configuration choice may be provided to the end user as to how many, and which particular ones, of a set of available topography-aligned grids 660 are used in this manner. In addition to, or instead of, providing the topography-aligned grids 660 to simulation models 670 and/or analytics 675, other uses for the grids 660 including providing them to the end user for inspection (e.g., as generated reports, graphical images, or other means); displaying the grids 660 for visualization and/or comparison with previously-generated grids; and so forth. It is noted that some simulation tools are able to ingest of a set of maps which are not exactly aligned in this manner. However, this results in a performance degradation for the computing resources that carry out the simulation (whereby the simulation software must compensate by performing the alignment, sampling, averaging, and so forth), and the degree of this performance degradation can be significant (depending, for example, on the size of the input grids). Accordingly, an embodiment of the present invention preferably eliminates this performance burden by aligning the data before it is provided to the simulation models 670 and/or analytics 675.

Figure 7:
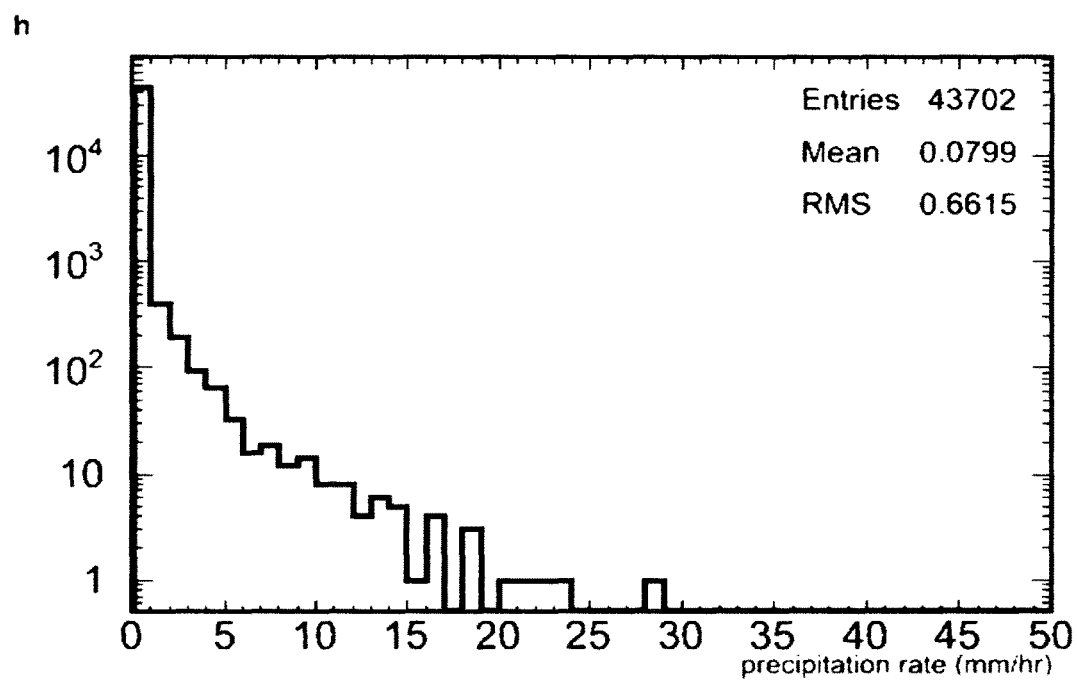
FIG. 7 depicts an example graph for average precipitation based on observations at a particular geographic location, and FIG. 8 provides another example graph where results are fitted to a generalized Pareto distribution to reflect probability that particular precipitation rates may occur in the future at a particular location.
Figure 8:
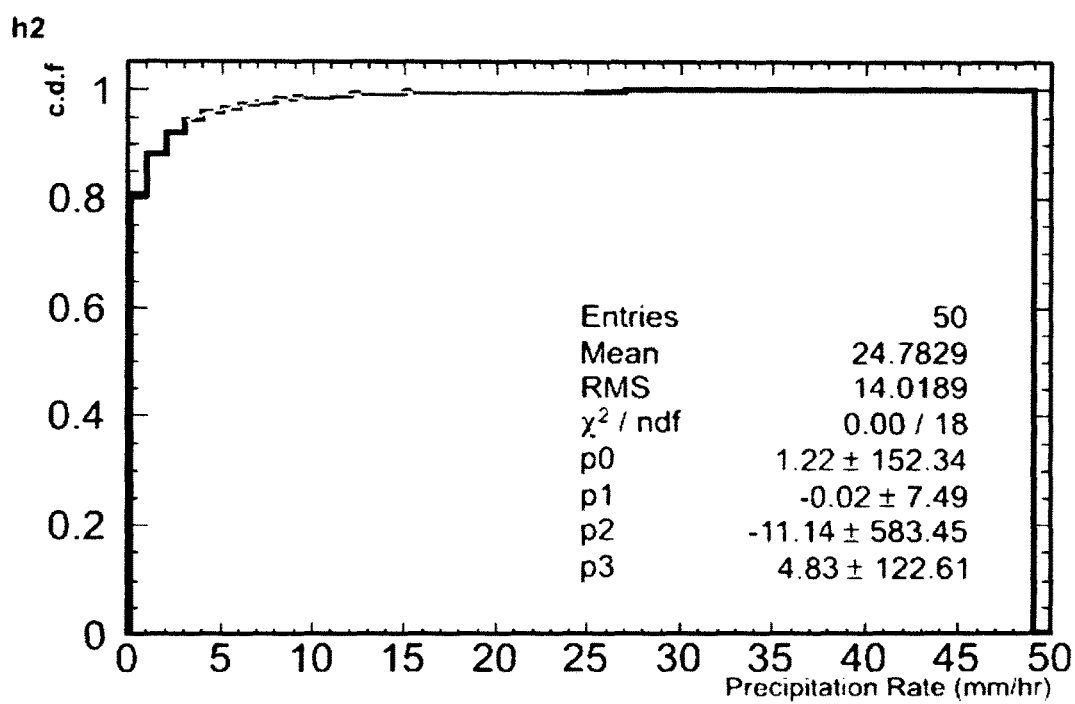

Simulation models 670 may perform many complex operations to simulate flooding according to the aggregated and transformed input data, as expressed (for example) by the grids created according to the flow in FIG. 6. Analytics 675 are processes that may extract various types of useful information from the aggregated data (and various types of analytics were noted above with reference to Block 270 of FIG. 2). FIG. 6 indicates that analytics 675 may be performed directly on data files 660, 665, and/or on data resulting from operation of simulation models 670. Threshold comparisons of the type discussed above with reference to Risk Assessor component 450 may also be performed on output data of FIG. 6 (although this has not been shown specifically in the figure). It is noted that analytics 675 may be used in an embodiment of the present invention, without also using a simulation model, as techniques are known in the art for using statistics to estimate weather forecasts without use of numerical weather prediction (provided, for example, that sufficient historical data is gathered and correlated with observed events with different input variables.) As one example of analytics 675 that may be used with an embodiment of the present invention, while analysis of historic precipitation data is normally focused on averages—average rainfall, average temperature, etc.—analytics 675 may comprise performing other evaluations, such as obtaining the standard deviations. In this manner, the focus is placed on what extreme events have occurred in the past at the location of interest and with what frequency such events may happen in the future at this location. See FIG. 7, which depicts an example graph 700 for average precipitation based on observations at a particular geographic location. In this example, the x-axis graphs rates of precipitation and the y-axis is a logarithmic view of the occurrence of particular precipitation rates. As noted in the legend, this graph is based on a sample size of 43,702 entries, and the mean is computed as 0.0799 millimeters per hour while the root mean square is computed as 0.6615 millimeters per hour. On the other hand, the example graph 800 of FIG. 8 may be generated by analytics 675, fitting results to a generalized Pareto distribution to reflect probability that particular precipitation rates (shown again on the x-axis) may occur in the future at this location, where the probability is represented as a cumulative distribution function (denoted as "c.d.f.") on the y-axis. In this example, various additional statistical values are presented in the legend, details of which are not deemed necessary to an understanding of the present invention.

While discussion herein is directed to an example scenario that provides flood risk analysis, this is by way of illustration and not of limitation. An embodiment of the present invention may be used, generally, in any scenario where problem resolution depends on a physical model and ingressing and transforming data maps that describe the physical environment (e.g., using various characteristics of the type discussed above) as input to simulation models and/or analytics. Accordingly, the Domain Builder 330 is intended as a generic component for use by different clients having client-specific requirements for handling data maps.

As an alternative to the flood risk analysis scenario discussed above, an embodiment of the present invention may be used with a wild fire application to determine the risk of wild fire at one or more locations of interest, in which case input to Domain Builder 330 may originate from data sources that are different from sources 300, 310 and be of data types that are different from data types 301, 302, 311. The data aggregated for use in this wild fire risk application may comprise, by way of example, historical data of wind directions, vegetation type, and soil moisture (and thus data 311 may be used in this application as well, in some cases). Analytics 340 may comprise, by way of example, generating a wild fire risk assessment at 350 for use by fire departments and/or other disaster management teams.

In yet another alternative to the flood risk analysis scenario discussed above, an embodiment of the present invention may be used for optimizing operation of data centers, including dynamic workload distribution among multiple data centers based on flood risk (in a similar manner to the discussion provided above for the supply chain scenario) or on wild fire risk or in view of other factors that may influence the data center operation.

As has been demonstrated, an embodiment of the present invention provides advantageous aggregating and transforming of data, and performing analytics thereupon, for application-specific optimization based on multiple data sources. The data is preferably ingressed automatically, and aligned to thereby allow meaningful referencing and consolidation, such that it is readily digestible by simulation (or other) software. Risk can therefore be assessed from the data, as desired.

Figure 9:
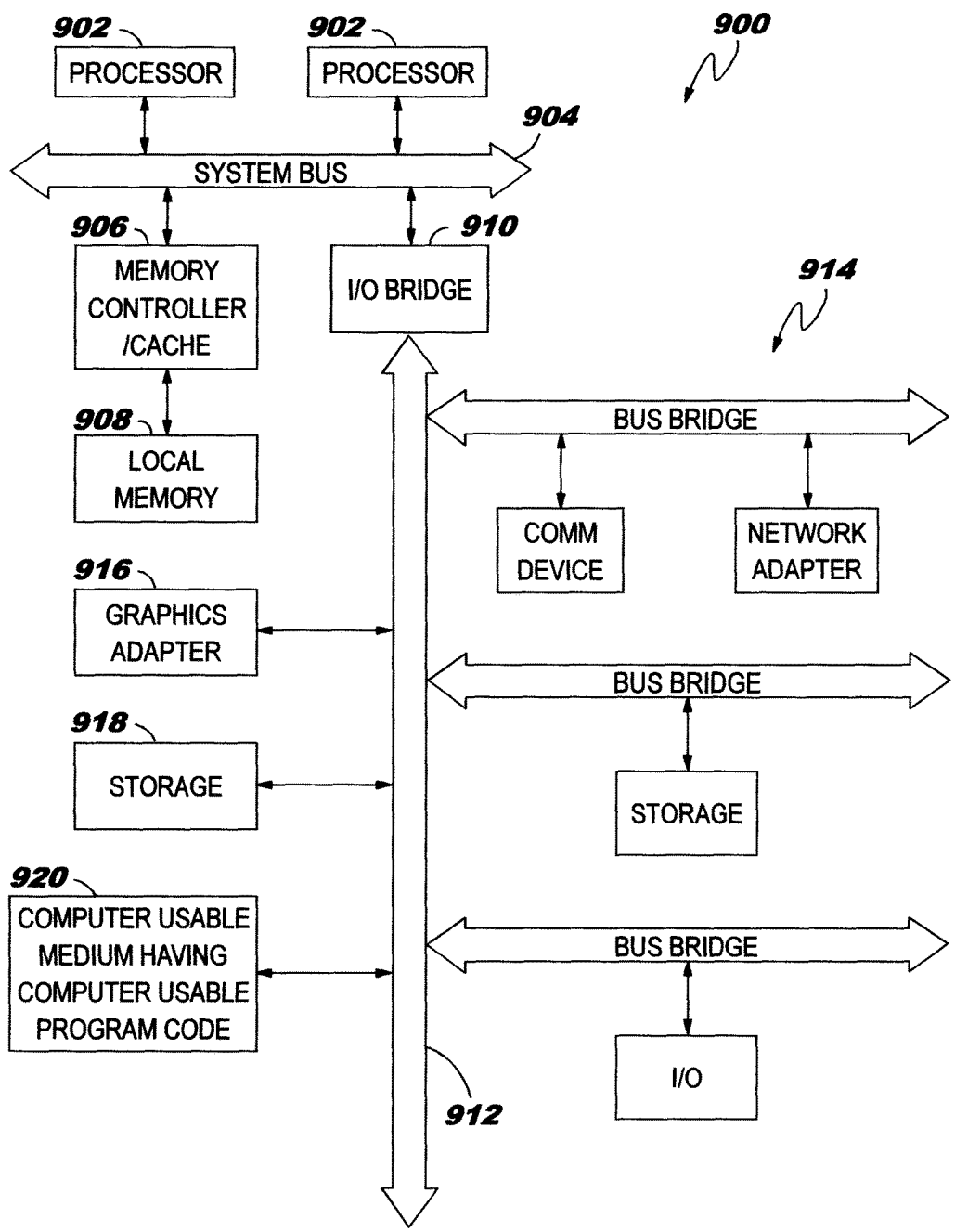
FIG. 9 depicts a block diagram of a data processing system in accordance with an embodiment of the present invention.

Referring now to FIG. 9, a block diagram of a data processing system is depicted in accordance with the present invention. Data processing system 900 may comprise a processor 902 connected to system bus 904. Also connected to system bus 904 is memory controller/cache 906, which provides an interface to local memory 908. An I/O bridge 910 is connected to the system bus 904 and provides an interface to an I/O bus 912. The I/O bus may be utilized to support one or more buses 914 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 916, storage 918, and a computer usable storage medium 920 having computer usable program code embodied thereon. The computer usable program code may be executed to execute any aspect of the present invention, as have been described herein.

Figure 10:
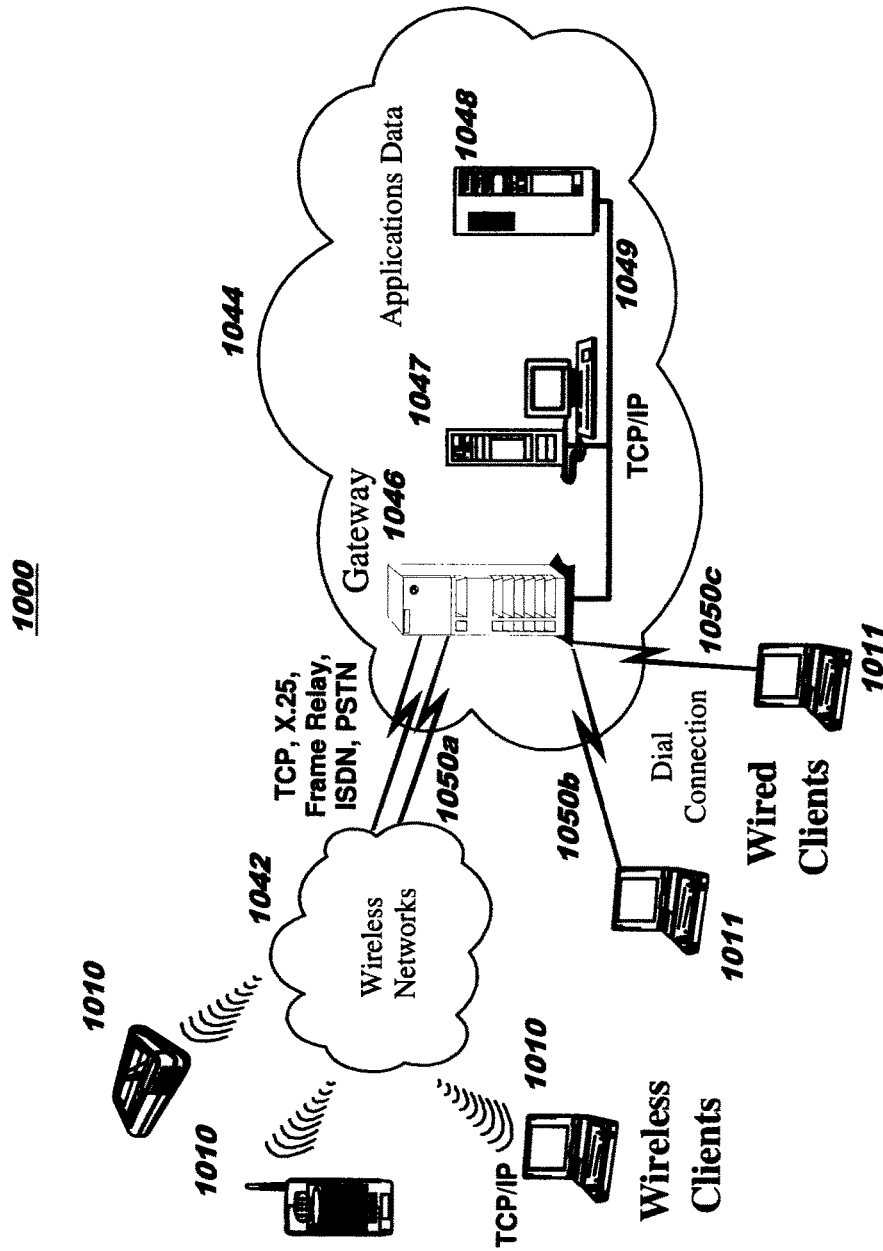
FIG. 10 depicts a representative networking environment in which one or more embodiments of the present invention may be used.

FIG. 10 illustrates a data processing network environment 1000 in which the present invention may be practiced. The data processing network 1000 may include a plurality of individual networks, such as wireless network 1042 and wired network 1044. A plurality of wireless devices 1010 may communicate over wireless network 1042, and a plurality of wired devices, shown in the figure (by way of illustration) as workstations 1011, may communicate over network 1044. Additionally, as those skilled in the art will appreciate, one or more local area networks ("LANs") may be included (not shown), where a LAN may comprise a plurality of devices coupled to a host processor.

Still referring to FIG. 10, the networks 1042 and 1044 may also include mainframe computers or servers, such as a gateway computer 1046 or application server 1047 (which may access a data repository 1048). A gateway computer 1046 serves as a point of entry into each network, such as network 1044. The gateway 1046 may be preferably coupled to another network 1042 by means of a communications link 1050*a*. The gateway 1046 may also be directly coupled to one or more workstations 1011 using a communications link 1050*b*, 1050*c*, and/or may be indirectly coupled to such devices. The gateway computer 1046 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks, and "System i" is a trademark, of IBM in the United States, other countries, or both.)

The gateway computer 1046 may also be coupled 1049 to a storage device (such as data repository 1048).

Those skilled in the art will appreciate that the gateway computer 1046 may be located a great geographic distance from the network 1042, and similarly, the workstations 1011 may be located some distance from the networks 1042 and 1044, respectively. For example, the network 1042 may be located in California, while the gateway 1046 may be located in Texas, and one or more of the workstations 1011 may be located in Florida. The workstations 1011 may connect to the wireless network 1042 using a networking protocol such as the Transmission Control Protocol/Internet Protocol ("TCP/IP") over a number of alternative connection media, such as cellular phone, radio frequency networks, satellite networks, etc. The wireless network 1042 preferably connects to the gateway 1046 using a network connection 1050*a* such as TCP or User Datagram Protocol ("UDP") over IP, X.25, Frame Relay, Integrated Services Digital Network ("ISDN"), Public Switched Telephone Network ("PSTN"), etc. The workstations 1011 may connect directly to the gateway 1046 using dial connections 1050*b* or 1050*c*. Further, the wireless network 1042 and network 1044 may connect to one or more other networks (not shown), in an analogous manner to that depicted in FIG. 10.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A method for assessing risk of flooding by aggregating and transforming data from a plurality of data sources, comprising:
    determining, for a supply chain spanning a plurality of geographical locations, a location of interest within the supply chain for flooding risk analysis;
    determining a plurality of data sources that describe a physical environment of the location;
    automatically ingressing, from selected ones of the plurality of sources, the data that describes the physical environment;
    programmatically transforming the ingressed data into data maps that are aligned to one another to allow referencing therebetween;
    evaluating risk of flooding pertaining to the location by using the aligned data maps as input to an evaluator selected from the group consisting of a simulation model and an analytic process, wherein processing performed by the evaluator comprises:
    watershed delineation to determine a geographical boundary of a watershed area surrounding the location;
    canopy interception analysis to determine an impact of physical canopy on an amount of rainfall that reaches a ground surface in the watershed area;
    soil infiltration analysis to determine how rainfall reaching the ground surface will be absorbed into soil at the ground surface in the watershed area; and
    2-dimensional diffusive routing to determine a flow of rainfall that reaches the ground surface in the watershed area but is not absorbed into the soil at the ground surface in the watershed area, the 2-dimensional diffusive routing comprising, for the non-absorbed rainfall, a mass of water flow and a momentum of the water flow; and
    responsive to determining that the risk of flooding pertaining to the location exceeds a predetermined threshold, determining an alternative geographical location for at least one of the plurality of geographical locations within the supply chain to thereby avoid using, at least temporarily, the location of interest, wherein the alternative geographical location is determined by repeating the processing performed by the evaluator to evaluate risk of flooding pertaining to the alternative geographical location and determining that the risk of flooding pertaining to the alternative geographical location does not exceed the predetermined threshold.

2. The method according to claim 1, wherein:
    the location is provided using longitude and latitude values; and
    determining the plurality of sources comprises:
    reverse geocoding the longitude and latitude values to determine identifying name information associated with the location; and
    locating the sources which provide suitable data for a geographical region corresponding to the identifying name information.

3. The method according to claim 1, wherein:
    the location is provided using coordinates; and
    determining the plurality of sources comprises:
    using the coordinates to access a mapping which correlates the coordinates with identifying name information associated with the location; and
    locating the sources which provide suitable data for a geographical region corresponding to the identifying name information.

4. The method according to claim 1, wherein the automatically ingressing comprises using session cookies to allow coordinated non-interactive download over a period of time, from the selected ones, of the data that describes the physical environment.

5. The method according to claim 1, wherein the transforming comprises programmatically changing a resolution of the ingressed data from at least a first of the selected ones to align with a resolution of the ingressed data from at least a second of the selected ones.

6. The method according to claim 1, wherein the transforming further comprises programmatically changing the resolution of the ingressed data from at least a first of the selected ones to align with a resolution of reference data for the location.

7. The method according to claim 1, wherein the transforming comprises programmatically removing at least one noise artifact from the ingressed data from at least a first of the selected ones.

8. The method according to claim 7, wherein:
    the ingressed data from the first of the selected ones comprises topography data pertaining to the location; and
    the programmatically removing comprises first identifying, in the ingressed topography data, the at least one noise artifact as being irrelevant to underlying topography of the location and therefore comprising a noise artifact to be removed from the ingressed topography data.

9. The method according to claim 1, wherein:
the ingressed data from at least a first of the selected ones comprises topography data pertaining to the location; and
the transforming comprises:
programmatically delineating, from the ingressed topography data, at least one watershed area pertaining to the location; and
programmatically removing, from the ingressed topography data, portions thereof which are separate from any of the at least one delineated watershed area.

10. The method according to claim 1, wherein:
the ingressed data from at least a first of the selected ones and a second of the selected ones comprises topography data pertaining to the location; and
the transforming comprises aligning the topography data from the first of the selected ones and the second of the selected ones to have an identical number of pixels and to match an identical geo-location of a reference topography data.

11. The method according to claim 1, wherein:
the ingressed data from at least a first of the selected ones comprises topography data pertaining to the location; and
the evaluating comprises:
determining, from the topography data, canopy interception information pertaining to the location; and
using the canopy interception information when determining the risk.

12. The method according to claim 1, wherein:
the ingressed data from the first of the selected ones comprises land use data pertaining to the location;
the transforming comprises programmatically extracting a feature from the ingressed data from at least a first of the selected ones, the feature describing use of land at or near the location; and
the programmatically extracting comprises removing, from the land use data, the feature from the ingressed data to allow focus on the land use data for the location.

13. The method according to claim 1, wherein:
the ingressed data from at least a first of the selected ones comprises soil data pertaining to the location; and
the evaluating comprises:
determining, from the soil data, soil infiltration information pertaining to the location; and
using the soil infiltration information when determining the risk.

14. The method according to claim 1, wherein:
the ingressed data from at least a first of the selected ones comprises historical data pertaining to the location; and
the transforming comprises programmatically cleansing the ingressed historical data such that a resulting one of the data maps has unsuitable information removed therefrom.

15. The method according to claim 1, wherein:
the ingressed data is organized as a plurality of grids; and
the transforming further comprises programmatically overlaying data of a first of the grids with data of a second of the grids, responsive to determining that the data of the second grid is of a better quality than the data of the first grid.

16. A method for assessing risk of wild fire by aggregating and transforming data from a plurality of data sources, comprising:
determining, for a supply chain spanning a plurality of geographical locations, a location of interest within the supply chain for wild fire risk analysis;
determining a plurality of data sources that describe a physical environment of the location;
automatically ingressing, from selected ones of the plurality of sources, the data that describes the physical environment, wherein the ingressed data comprises:
historical data pertaining to wind directions for a first area that includes the location;
vegetation type information for a second area that includes the location; and
soil moisture information for a third area that includes the location, and wherein the first area, the second area, and the third area may be overlapping or distinct;
programmatically transforming the ingressed data into data maps that are aligned to one another to allow referencing therebetween;
evaluating risk of wild fire pertaining to the location by using the aligned data maps as input to an evaluator selected from the group consisting of a simulation model and an analytic process; and
responsive to determining that the risk of wild fire pertaining to the location exceeds a predetermined threshold, determining an alternative geographical location for at least one of the plurality of geographical locations within the supply chain to thereby avoid using, at least temporarily, the location of interest, wherein the alternative geographical location is determined by repeating the evaluating risk performed by the evaluator to evaluate risk of wild fire pertaining to the alternative geographical location and determining that the risk of wild fire pertaining to the alternative geographical location does not exceed the predetermined threshold.

* * * * *